Jan. 15, 1935. O. KRETCHMER 1,987,960
TYPEWRITER KEY CUSHION
Filed May 9, 1933
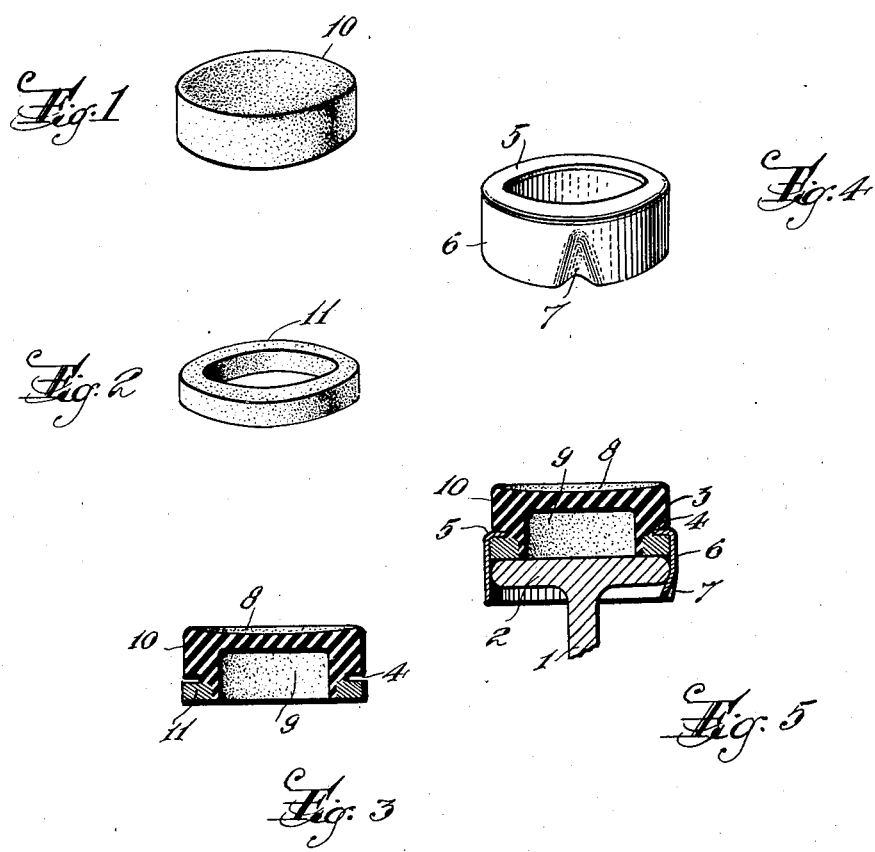
INVENTOR
Otto Kretchmer,
BY
ATTORNEY Patented Jan. 15, 1935

1,987,960

UNITED STATES PATENT OFFICE 1,987,960

TYPEWRITER KEY CUSHION

Otto Kretchmer, Newark, N. J., assignor to Peerless Key Company, Inc., New York, N. Y., a corporation of New York Application May 9, 1933, Serial No. 670,082

2 Claims. (Cl. 197—103)

This invention relates to key cushions for typewriters and other key operated machines, and consists in a soft cylindrical key cushion preferably with a concave upper surface, containing an internal air space beneath the concave surface receiving the touch of the finger, and provided with a lower portion constituting an outwardly extending flange vulcanized to a different degree of hardness from the other portion of the cushion key and adapted to interlock with an inward projection from an open metallic securing member carried by the key bar. This construction provides maximum elasticity or softness of the upper surface of the key cushion combined with sufficient hardness and rigidity of connection with the metallic securing member.

The primary object of the invention is the construction of a key cushion of soft rubber, provided with a lower end constituting an outwardly extending flange, of a different degree of hardness so that, when the lower end or flange of the key cushion is positioned in the usual securing member, the accidental displacement or turning of the key cushion in the securing member is prevented.

A further object of the invention is to provide a simple and inexpensive method of making key cushions, which preferably consists in vulcanizing a ring of hard rubber to the lower end of the soft rubber key cushion. To secure the key cushion in the securing member it is only necessary to slightly heat the ring by placing the same on a steam table or the like to render the same yieldable and pliable so that the same can be readily inserted into the opening of the securing member, thereby permanently securing the key cushion in the securing member.

A further object of the invention is to provide a key cushion consisting of few and simple parts, adapted to be rapidly and economically manufactured in large quantities by a simple and inexpensive method.

These and other advantageous objects which will later appear, are accomplished by the simple and practical construction and arrangement of parts hereinafter described and exhibited in the accompanying drawing.

In the accompanying drawing, forming part of my invention, and in which similar numerals of reference indicate like parts throughout the several views, Figs. 1 and 2 represent respectively, the soft rubber upper portion and the rubber lower portion which is of a different degree of hardness, and which are subsequently vulcanized together to form the completed key cushion as illustrated in Fig. 3, Fig. 3 represents a vertical sectional view of the completed key cushion, embodying my invention, Fig. 4 represents a perspective view of a metallic securing member adapted to receive the key cushion, and Fig. 5 represents a vertical sectional view of the completed typewriter key embodying my invention, and secured to a key bar.

In the drawing, 1 represents the ordinary key bar provided with a key head 2. The key cushion 3 is provided with an annular groove 4 which is adapted to interlock with an inward projection 5 of an open metallic securing member 6 which is preferably provided with an indented portion 7 by which the member 6 is secured to the key head 2 of the key bar 1.

The key cushion 3 is preferably provided with a concave upper surface 8 and an internal air space 9, beneath the surface 8 which receives the touch of the finger.

In Fig. 1 is represented the soft rubber upper portion 10 and in Fig. 2 is represented the rubber lower portion 11 preferably in the form of a ring and of a different degree of hardness from the upper portion 10, which together are placed in a suitable die to form the completed key cushion as shown in Fig. 3 with the concave surface 8 and the air space 9. The annular groove 4 is also formed simultaneously with the formation of the concave surface 8 and the air space 9 at the time when the lower portion or ring 11 is vulcanized to the portion 10.

Due to the fact that the ring 11 is of a different degree of hardness from the upper portion 10, it will be readily understood that when the same, as previously stated, is vulcanized by means of suitable tools and dies to the soft rubber upper portion 10, an outwardly extending flange is provided of a different degree of hardness. The flange is received in the metallic cap or securing member 6 and is held therein by the inward projection 5 of the securing member 6, which engages the annular groove 4, and prevents the key cushion from turning in the member 6 and from accidental displacement from the same. The flange is preferably of larger cross-section than the upper portion 10, so that it will be snugly received by the securing member 6.

The manner of securing the key cushion to the securing member consists in first heating the outwardly extending flange or ring member 11 by placing the same on a steam table or the like until the flange becomes sufficiently yieldable and pliable to enable it to be forced through the opening in the securing member.

If desired, the ring 11 may be dispensed with, and the lower end of the cushion may be vulcanized to hardness, or may be hardened by varying the ingredients of the mixture from which the cushion is made so that the upper surface of the cushion will have a maximum of elasticity or softness, while the lower end thereof will be hard and rigid, to positively and permanently secure the cushion in the member 7.

The foregoing disclosure is to be regarded as descriptive and illustrative only, and not as restrictive or limitative of the invention, of which obviously an embodiment may be constructed including many modifications, without departing from the general scope herein indicated and denoted in the appended claims.

Having thus described my invention, what I claim as new and desire to secure by Letters Patent, is:

1. In a typewriter key cushion made of soft rubber, a first annular flange projecting from the bottom of the cushion and spaced inwardly from the side wall thereof, a second annular flange projecting from the bottom of the first annular flange and spaced inwardly from the side wall of the first annular flange, and a hard rubber ring attached to the side wall of the second annular flange.

2. In a typewriter key cushion made of soft rubber, a first annular flange integral with and projecting from the bottom of the cushion and spaced inwardly from the side wall thereof, a second flange projecting from the bottom of the first flange, and a hard rubber ring attached to said flanges and spaced from the bottom of the cushion.

OTTO KRETCHMER.